Aug. 2, 1932.  W. J. ASSELSTINE  1,869,732
APPARATUS FOR THE CONCENTRATION OF ORES
Filed Nov. 10, 1930  2 Sheets-Sheet 1

Inventor:
W. J. Asselstine,
Munson H. Lane
Att'y.

Aug. 2, 1932.   W. J. ASSELSTINE   1,869,732
APPARATUS FOR THE CONCENTRATION OF ORES
Filed Nov. 10, 1930   2 Sheets-Sheet 2
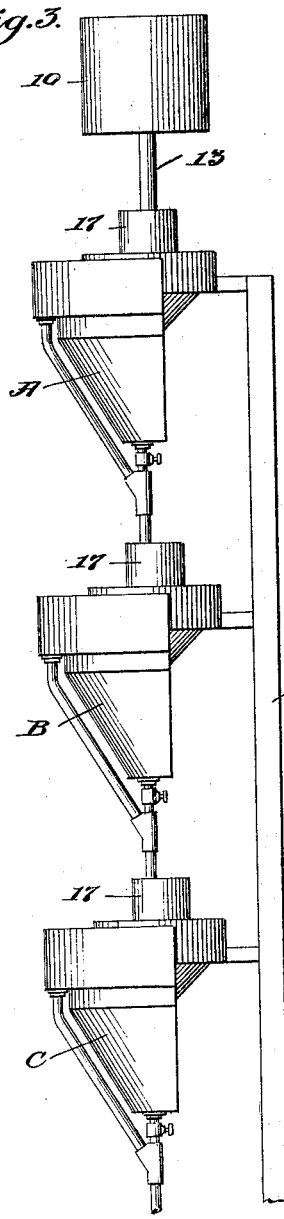
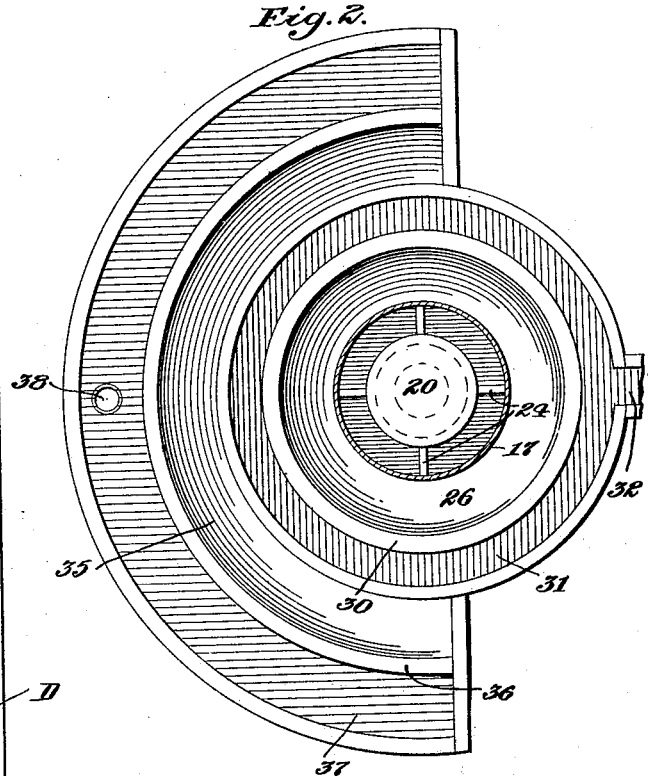
Inventor:
W. J. Asselstine,
Attÿ.

Patented Aug. 2, 1932

1,869,732

UNITED STATES PATENT OFFICE

WILLIAM JAMES ASSELSTINE, OF PREMIER, BRITISH COLUMBIA, CANADA, ASSIGNOR OF ONE-HALF TO DALE L. PITT, OF PREMIER, CANADA

APPARATUS FOR THE CONCENTRATION OF ORES

Application filed November 10, 1930. Serial No. 494,754.

The invention relates to improvements in the concentration of ores or other material by the froth flotation process. According to such process, finely divided ore, or other substance to be floated, is mixed with water, oil and other chemicals or reagents and the whole mixture, known as pulp, is then aerated or mixed with air, for the purpose of producing a froth, which froth contains a high percentage of the metal-containing portions of the ore. This froth is then separated from the remaining material and subjected to further treatment for the recovery of the valuable constituents. The aeration step is accomplished by suitable agitation of the pulp in the presence of air. After the aeration or mixing step, the froth must be allowed to separate from the remaining material, and for this purpose a quiescent zone is desirable.

Aeration has been accomplished by the use of mechanically compressed air, which produces the desired agitation. However, this method of aeration is expensive, owing to the cost of compressing the air, and also involves unnecessary wear and tear upon the concentration apparatus, due to the violent vibration set up.

It has also been proposed to aerate the pulp by allowing the pulp to fall violently into an open chamber having baffles therein, the pulp striking a baffle below the surface of the pulp body, and in the course of this violent agitation incorporating the necessary air from the atmosphere into the pulp body. According to this type of process, however, the separation of the froth takes place in the aeration chamber, and consequently the agitation necessarily attendant upon the aeration of the pulp interferes materially with the separation step. With this latter type of process, attempts have also been made to obtain a quiescent zone within the aeration chamber, to permit froth separation to take place, but obviously the conditions required for aeration and separation are directly opposed, and consequently where the two steps are carried out in a single chamber, each tends to interfere with the other. It has also been found that where the pulp plunges onto baffles in an open chamber, a violent vibration takes place which is injurious to the apparatus. Moreover, in a machine of the type wherein the circulation of the pulp is dependent upon the violence of the agitation, the coarser the material to be treated, the greater the volume of air required in order to keep the coarse material in circulation. More difficulty also results with this increased agitation, as this hinders the formation of a quiescent zone and the ultimate creation of a bubble column.

According to my process, the pulp is placed in an open feed tank from which it flows through a suitable pipe into an aeration chamber closed at the top, and having baffles within the chamber designed to deflect the pulp to secure adequate admixture with the pulp of air which is carried by the pulp from the open tank and downwardly through the connecting pipe. Air escaping from the pulp within the closed chamber rises and fills the chamber above the baffles, forming an air cushion which prevents undue vibration. After having left the closed aeration chamber, the aerated pulp passes into a separation chamber, distinct from the aeration and mixing chamber, wherein quiescence is maintained, suitable for the effective separation of the froth, which passes over a suitable weir into a launder, whence it is withdrawn for further treatment. The remaining material passes from the separation chamber into a discharge zone, from which the material may pass into an additional unit, similar to the one just described, for further treatment to effect the separation of any metal-bearing material still remaining. Any desired number of such additional units may be employed. The improved process avoids the expense due to the use of compressed air, obviates undue vibration, and insures efficient aeration and separation of the froth.

The invention will be more readily understood by reference to the accompanying drawings, setting forth a preferred or illustrative embodiment of the invention. In the drawings, Fig. 1 is a vertical sectional view showing one unit of the aerating and separating apparatus;

Fig. 2 is a top plan view of the same, the feed tank being omitted, and

Fig. 3 is a diagrammatic view on a reduced scale, showing a plurality of the units connected in vertical series.

Figure 1:
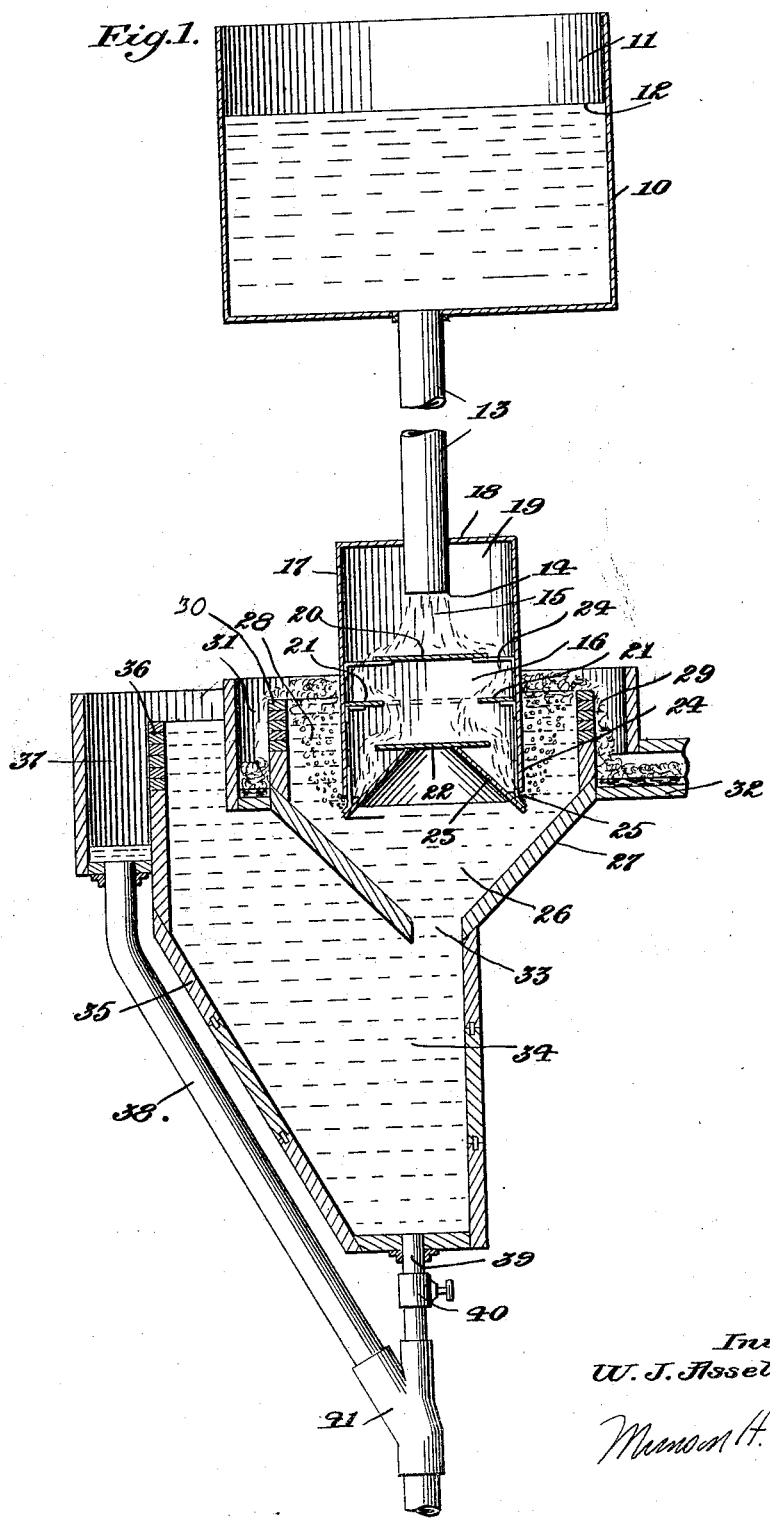

The drawings are intended as diagrammatic in character and as illustrating the principles of the invention, rather than as limiting the same to the precise details set forth. Referring particularly to Fig. 1, reference numeral 10 denotes a suitable feed tank open at the top 11 and filled with pulp to the level 12. The pulp consists of the proper proportion of finely ground ore, water and other necessary reagents. Leading from the bottom of the tank 10 is a feed pipe 13, discharging at 14 a volume of pulp 15, which has admixed therewith air drawn from the feed tank. The pulp is discharged into an aeration chamber 16, comprising a vessel 17 closed at the top 18 and provided with a series of horizontal baffles, herein indicated at 20, 21 and 22, by means of which the direction of the pulp is changed and a thorough admixture with the air obtained.

Below the lowermost horizontal baffle 22 are inclined baffles 23, which provide a restricted opening 25 into a separation chamber 26. The baffles within the aeration chamber are suitably secured by means of supports indicated at 24. By means of these baffles complete aeration takes place and a certain portion of the air entrained with the pulp escapes, rising into an air chamber 19 above the baffles, which chamber acts as a cushion to prevent undue vibration, due to the contact of the pulp with the baffles during the mixing and aeration steps. The separation chamber 26 is formed by a truncated cone-like member 27 and is provided at the upper portion with a bubble column chamber 28. The separation chamber, it will be noted, is entirely distinct from the aeration chamber, and the pulp enters the separation chamber at a relatively low velocity and without undue agitation or vibration. This results in the formation of a quiescent zone which is particularly adapted for the separation of the bubbles from the remaining material, the bubbles rising in the bubble column 28 and forming a froth 29 which passes over a weir 30 into a launder 31, from which the bubbles may be withdrawn through a suitable overflow 32 and subjected to further treatment.

The separation chamber opens at its lower portion 33 into a discharge zone 34. This zone, as shown, is housed within a spitz-shaped tank or cone 35, which is provided with a weir overflow 36 for the fines, which pass thence into a launder 37 and overflow pipe 38. The coarse sand is discharged at the bottom of the zone 34 through a pipe 39 having a valve 40 therein and opening into a coupling 41 in which the coarse material meets the fines passing downwardly through the overflow pipe 38 from the launder 37.

Preferably a plurality of agitating and separating units of the type above described are connected in vertical series as indicated in Fig. 3, in which three such units, A, B and C are indicated, their froth overflows being connected to a common froth pipe D.

The operation of the device is as follows:

The pulp, consisting of the proper proportion of finely ground ore, water and emulsifying reagents, is introduced into the aerating chamber 16 from the feed pipe 13. This mixture drops first upon the upper horizontal baffle 20, the pulp being broken up and the direction of flow changed. The pulp is thrown outwards and, striking the sides of the aerating chamber, is again broken up and then urged toward the center by the second baffle 21. This baffling action continues through the entire length of the aerating chamber, producing a mixing and aerating effect. The pulp, passing into the chamber through the unperforated pipe 13, tends to produce a vacuum which serves to draw an additional volume of air down with the pulp material fed into the aerating chamber.

The pulp, while cascading through the baffles, is broken up and the small particles come in contact with the air. This is the ideal condition for the maximum association of the mineral particles with the air contained in the chamber 16. The baffles also break the fall of the pulp above the pulp body in the separation chamber 26, which permits the formation of a quiet zone within the separation chamber. The action of the pulp within the closed aeration chamber 16 is distinctly different from any flotation process known to me, for the pulp is completely broken up and exposed to the free compressed air within the chamber. Each particle of mineral falling gently through the baffles drives ahead of it into the pulp body a small bubble of air. After being forced down into the pulp, this bubble of air tends to rise to the surface and, uniting with other similar bubbles, creates the bubble column 28 at the top of the separation chamber. Each little particle of floatable mineral within the quiet zone 26 having attached to its surface gas or air, also tends to rise to the surface. The natural tendency is for these to unite with one another, thus creating the mineral-bearing column of froth. According to my process this natural tendency is not interfered with by any agitation due to the aeration of the pulp in the same chamber.

The material from which the froth has been separated passes thence into the discharge zone 34, one portion passing over the weir 36 and the other containing the coarser particles passing downwardly through the valve control pipe 39. By a suitable regulation of the valve 40 and the weir 36, the height of the pulp outside of the aerating chamber 16 may be controlled, and this in turn controls the amount of air drawn down by the pulp through the feed pipe 13 and admitted into the pulp body to enliven the bubble column. The units operate in series and as the values from the pulp become depleted in the last cells of the series, the concentrate will be of lower grade. This concentrate or middlings may then be returned to the circuit for further grinding or treatment by flotation.

My invention includes the employment of a closed aeration chamber separate and distinct from the separating zone, so that the latter may be quiet and without agitation, whereby the low grade material can separate from the rising air and gas-bearing mineral particles and thence sink into the discharge chamber 34 and continue into the following cells for further treatment.

To secure a high grade concentrate a quiet zone is essential, and when this is achieved a minute quantity of air is all that is necessary to build up a desirable bubble column. For this reason agitation is removed from the pulp body within the separation chamber 26 and carried on entirely within the feed pipe 13 and aerating chamber 16.

It may be noted that by raising or lowering the lip of the weir 36 the height or level of the pulp in the truncated cone 27 is controlled. By controlling this height of the pulp, the pressure of the air collected at 19 near the top of the aeration chamber is determined. When this pressure builds up to substantially greater than the outside pressure, air is forced through the pulp and the bubble column 28 is kept alive. The depth or height of the bubble column is thus determined and the amount of froth carrying the floating particles is controlled.

By the careful adjustment of the height of the pulp, a very fine bubble column is formed, and the material which is desired to float off passes into the launder 31.

The building up of a controlled greater than atmospheric pressure at 19 within the aeration chamber, without the use of mechanical compressors is believed to be one of the novel features of the invention.

The invention has been described in detail for the purpose of illustration, but it will be evident that many variations and modifications may be resorted to without departing from the spirit of the invention.

What I claim is:

1. An ore flotation apparatus comprising a pulp feed tank open to the atmosphere, a closed aeration chamber, a compressed air zone at the upper portion of the aeration chamber providing an air cushion to prevent undue vibration, a feed pipe leading from the feed tank to the aeration chamber, a series of baffles in said aeration chamber, a separation chamber separate from said aeration chamber but in communication therewith, wherein froth separates from the pulp, an overflow launder for said froth, and a pulp discharge outlet at the bottom of the separation zone.

2. In an ore flotation apparatus, a closed aeration chamber having baffles therein, a compressed air zone at the upper portion of the aeration chamber providing an air cushion to prevent undue vibration, and a separation chamber distinct from the aeration chamber providing a quiescent zone to facilitate the formation of froth.

3. In an ore flotation apparatus, a closed aeration chamber having baffles therein, a compressed air zone at the upper portion of the aeration chamber providing an air cushion to prevent undue vibration, a separation chamber distinct from the aeration chamber providing a quiescent zone to facilitate the formation of froth, and a launder for receiving the froth from the separation chamber.

4. In an ore flotation apparatus, a closed aeration chamber having baffles therein, a compressed air zone at the upper portion of the aeration chamber providing an air cushion to prevent undue vibration, a separation chamber distinct from the aeration chamber providing a quiescent zone to facilitate the formation of froth, and an outlet at the bottom of the separation chamber for discharging material from which the froth has separated.

5. In an ore flotation apparatus, a closed aeration chamber having baffles therein, a compressed air zone at the upper portion of the aeration chamber providing an air cushion to prevent undue vibration, a separation chamber distinct from the aeration chamber providing a quiescent zone to facilitate the formation of froth, and means for regulating the rate of froth discharge.

6. In an ore flotation apparatus, a closed aeration chamber having baffles therein, a compressed air zone at the upper portion of the aeration chamber providing an air cushion to prevent undue vibration, a separation chamber distinct from the aeration chamber providing a quiescent zone to facilitate the formation of froth, and means for regulating the liquid level within the separation chamber.

7. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber.

8. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being distinct from the aeration chamber and providing a quiescent zone to facilitate separation of froth.

9. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom.

10. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom and an overflow weir at the top.

11. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom and an overflow weir at the top adjustable in height.

12. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom and an overflow weir at the top, and a launder for receiving froth passing over said weir.

13. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom, and an outer liquid-containing chamber surrounding the separation chamber.

14. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom, and an outer liquid-containing chamber surrounding the separation chamber, said outer chamber having an adjustable overflow weir whereby the pulp level within the separation chamber may be adjusted.

15. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom, and an outer liquid-containing chamber surrounding the separation chamber, said outer chamber having a weir overflow at the top for the fines and a discharge opening at the bottom for coarser material.

16. In an ore flotation apparatus, a closed aeration chamber, a pulp feed tank above the aeration chamber having a feed pipe leading into the interior of the aeration chamber, a compressed air zone at the upper portion of the aeration chamber providing an air cushion to prevent undue vibration, pulp deflecting means within the aeration chamber to insure admixture of air with the pulp, a restricted outlet leading from the aeration chamber to a separation chamber, whereby the aerated pulp passes quietly from the aeration chamber into the separation chamber, the separation chamber being of frusto-conical formation, with a pulp discharge opening at the bottom, and an outer liquid-containing chamber surrounding the separation chamber, said outer chamber having a weir overflow at the top for the fines and a valved discharge opening at the bottom for coarser material.

In testimony whereof I affix my signature.

WILLIAM JAMES ASSELSTINE.